3,769,210
CHALCOGENIDES INTERCALATED WITH AMMONIUM AND NON-HEAVY METAL INORGANIC SALTS AND HYDROXIDES
Michael Cais, Palos Altos, Fred R. Gamble, Jr., Los Altos, and Jeanne Helen Osiecki, Los Altos Hills, Calif., assignors to Synvar Associates, Palo Alto, Calif.
No Drawing. Filed Nov. 25, 1970, Ser. No. 92,854
Int. Cl. C10m 7/02, 7/06
U.S. Cl. 252—25        7 Claims

ABSTRACT OF THE DISCLOSURE

Novel compositions of matter formed of ammonium and non-heavy metal inorganic salt and hydroxide intercalates and heavy metal layered chalcogenides, wherein the chalocogen is selected from sulfur, selenium and/or tellurium. The novel intercalated compounds display advantageous characteristics when utilized as solid lubricants, and as X-ray diffraction grating crystals. Certain of the intercalated transition metal chalcogenides also exhibit unique superconductivity characteristics.

---

This invention relates to novel compositions of matter formed by intercalating heavy metal chalcogenides with certain inorganic compounds hereinafter sometimes referred to as intercalates. More particularly, the invention relates to novel compositions including an intercalate and a heavy metal layered chalcogenide, where the chalcogen is selected from sulfur, selenium and tellurium or mixtures thereof, and wherein the heavy metal is selected from titanium, vanadium, zirconium, niobium, hafnium, tantalum, palladium, platinum and gallium, or mixtures thereof, that form layered chalcogenides with at least certain chalcogens.

Approximately one half of the power generated in the world is consumed by the heat produced by friction. Lubricants are used to reduce this loss and to prevent wear. The most generally useful lubricants are petroleum-based materials such as oils and greases. The availability of solid lubricants has heretofore been limited to a few layered structures in which the molecular platelets readily slide over each other. Examples of such materials are graphite, molybdenum disulfide, talc and boron nitride.

Solid lubricants generally have poorer lubricity and are usually employed only where petroleum based lubricants do not have satisfactory properties. Such solid lubricant materials are generally selected for use because of their resistance to environmental conditions that conventional oil and grease lubricants cannot tolerate. For instance oils and greases cannot be used at either temperature extreme, in vacuum or under extremely high loads. Under such conditions the known solid lubricants must be employed even though they possess higher coefficients of friction, higher wear characteristics and lower lifetime than conventional oils and greases. Known solid lubricants also have a tendency to settle out without necessarily reaching the region where they are required, when applied as a suspension in a fluid. When they are applied as a thick paste to overcome the tendency to settle out, it has usually been difficult to force the paste through the narrow clearances normally available between the sliding metal surfaces.

It has now been found that inorganic ionic compounds can be intercalated, singularly, successively by displacement of a previous intercalate, or collectively, between the layered structures of certain of the heavy metal chalcogenides, wherein the chalcogen is selected from sulfur, selenium and tellurium or mixtures thereof, to provide novel compositions of matter. Within this broad concept, suitable counterions (cations) include ammonium and metal atoms in an appropriate oxidation state. Ionic compounds wherein the counterion is selected from ammonium and alkali and alkaline earth metals are preferred. In addition, the inorganic ionic compounds that have been found to be most readily intercalated are those containing an anion selected from $H^-$, $NO_3^-$, $SO_4^=$, $NH_2^-$, $OH^-$, $HS^-$, $S^=$, $SO_3^=$, $HSO_3^-$, $N_3^-$, $NO_2^-$, $X^-$, and the like, wherein X is selected from chloride, bromide and iodide. Within this broad concept, anions classified as electron donors are especially advantageous, with those that are strong Lewis bases, i.e., those exhibiting a $pk_a$ of above about 2.0, being preferred.

Pure metals, as distinguished from metal ions covalently or ionically bonded into compounds, are not intended to be included among the intercalates of this invention. Thus, those skilled in this art are aware that alkali and alkaline earth metals per se, have been intercalated into various layered chalcogenides by known solution techniques. Such intercalation compositions have properties corresponding to the properties of the electropositive metal form which they are formed, i.e. such intercalated chalcogenides are qualitatively different from the compositions of the present disclosure. Some are pyrophoric, while all react vigorously with water to liberate hydrogen. In addition, various metal atoms have been incorporated into layered chalcogenides by adding the metal to the reactants during the initial formation of the layered crystal.

The following are representative of suitable anions. Representative counterions are also set forth.

ANIONS $H_2AsO_4^-$, $HAsO_4^=$, $AsO_4^\equiv$, $H_2AsO_3^-$, $H_2BO_3^-$, $HBO_3^=$, $BO_3^\equiv$, $HCO_3^-$, $CO_3^=$, $H_3GeO_4^-$, $H_2GeO_4^=$, $OBr^-$, $OCl^-$, $OI^-$, $NO_2^-$, $F^-$, $H_2PO_4^-$, $HPO_4^=$, $PO_4^\equiv$, $H_2PO_3^=$, $H_3P_2O_5^-$, $H_2P_2O_5^=$, $HSeO_3^-$, $SeO_3^=$, $HSiO_3^-$, $SiO_3^=$, $SCN^-$, $OCN^-$, $SO_4^=$, $SO_3^=$, $HTeO_4^-$, $TeO_4^=$, $HB_4O_7^-$, $OH^-$, $NH_2^-$, $S_2O_3^=$, $S^=$, $HS^-$, $N_3^-$, $HTeO_3^-$, $TeO_3^=$, $H^-$, $AlO_2^-$, $BeO_2^=$, $S_2O_7^=$, $S_2O_4^=$, $NO_3^-$, $CrO_4^=$, $Br^-$, $I^-$, $MnO_4^-$, $Cr_2O_7^=$, $P_2O_7^=$, $P_2O_6^=$, $Cl^-$.

COUNTERIONS $NH_4^+$, $Na^+$, $K^+$, $Ca^{++}$, $Mg^{++}$.

Although it is not intended that the discovery of unobvious solid lubrication characteristics of the intercalated compositions of this invention be limited to any theoretical concept, it appears that the intercalate becomes concentrated between the solid planes of the chalcogenide, in a layer or layers, and decreases the shear strength of the material. In addition, the intercalated chalcogenides appear to exhibit a higher degree of adhesion and better film forming properties.

Within the broad concept of the present invention it has also been found that certain of the transition metal chalcogenides, i.e., the metallic compounds including chalcogenides formed from Group V–B elements and certain other transition element tellurides exhibit unique properties of superconductivity, when these chalcogenides are intercalated, as hereinafter defined. Sometimes the critical temperature of the chalcogenides is raised because of the presence of an intercalate, as defined in this invention. However, in all cases, the materials exhibit uniquely high anisotropy of the critical field and critical current. The usefulness of many of these materials derives from their extremely high structural and electrical anisotropy as well as from the ease with which structure and properties can be tailored by modification of the layered chalcogenide or the intercalate. Intercalated sulfides formed from the transition elements of Group V–B of the Periodic Table of the Elements, especially niobium and tantalum, have been found to have especially useful superconductive characteristics. In addition, the intercalated compositions of this invention are generally useful as X-ray diffraction grating crystals; see copending U.S. patent application, Ser. No. 54,847, filed July 14, 1970, now Pat. No. 3,688,109.

Intended to be included among those layered chalcogenides that form the novel compositions of this invention, by intercalation with the aforementioned inorganic ionic materials, are chalcogenides containing palladium and platinum and transition elements classified in Groups IV–B and V–B of the Periodic Table of Elements. This definition includes titanium, vanadium, zirconium, niobium, hafnium and tantalum, with respect to all chalcogens. In addition to the foregoing elements, suitable layered tellurides also include gallium. Also contemplated are layered chalcogenides containing mixed cations such as $Nb_{1/2}Ta_{1/2}S_2$. Cations selected from among those forming intercalatable layered crystals are preferred but only one such cation need be present. In other words, a crystal may contain a cation selected from the aforementioned group of palladium, platinum, gallium or Group IV–B or V–B transition elements, together with a second cation which by itself may or may not form a layered crystal with a chalcogen. It is contemplated, however, that the cation present in the largest amount be selected from among those forming intercalatable layered crystals. The other cations need only assume nearly identical positions in the crystal to the first so that layered crystals result. Such mixed cation chalcogenides are known to those skilled in the art. All of the foregoing categories of chalcogenides can be intercalated with any of the foregoing group of inorganic ionic compounds.

Turning first to a more detailed description of those chalcogenides that have been found to be most readily intercalated, it appears that chalcogenides wherein the metal element has an incompletely occupied low-lying orbital favor the formation of intercalated compounds in which the intercalate forms a bond by donating electrons into this orbital. Such chalcogenides freqently include narrow gap semiconductors. This definition includes the chalcogenides formed from elements in Group IV–B which possess an unfilled nonbonding band, principally of $dxy$, $dyz$ and $dxz$ character. Further within this subgroup of chalcogenides, the intercalated state is most favored among the lower atomic weight chalcogens because the layer-to-layer interactions between the chalcogens are weaker. Consequently the Group IV–B sulfides appear to be more readily intercalated than either the selenides or the tellurides.

Similar theoretical considerations seem to apply to elements in Group V–B. There, however, the chalcogens are frequently trigonal prismatic about the metal atom and a $d_z^2$ band is split off the nonbonding $d$ band. This narrow band is only half occupied and so is available for bond formation. The $d_z^2$ orbital is normal to the planes and points into the gap through a triangle of chalcogens. Once again sulfides are more readily intercalated than the selenides and the selenides are more readily intercalated than are tellurides. As a consequence of such variations in orbitals, chalcogenides formed from elements in Groups IV–B and V–B comprise a preferred grouping as they are most readily intercalated by electron donors such as the inorganic anions of this invention. Within this preferred grouping, chalcogenides and especially sulfides of tantalum and niobium are particularly useful.

Although it is not intended that this invention be limited by any theoretical concept, compounds useful for intercalation with the chalcogenides, as broadly defined herein, appear to be dependent upon crystal packing forces, steric hindrance about the active center, as well as upon the effective molecular size.

With respect to the size of the intercalate molecule, the opening of the dichalcogenide layers appears to require the expenditure of a specific amount of energy per unit area. Therefore there must be a minimum number of molecule-layer interactions of a given strength per unit area before the energy of the intercalated assembly is lower than that of the unintercalated assembly (i.e. molecules outside, lattice closed). In other words, a specific basic group in a small molecule might be sufficient to form a stable intercalation complex but the same basic group might not be sufficient for a large molecule, i.e. large in the sense that it would obscure much of the dichalcogenide plane and in doing so reduce the number of molecule layer interactions below the minimum per unit area required. It also appears that an intercalated species that is able to pack closely in a highly ordered arrangement is favored because the crystal is then further stabilized by intermolar interactions.

Heavy metal chalcogenides can be prepared by any of a number of conventional methods known to those skilled in this art; see for example J. Inorg. Nucl. Chem., vol. 24, pages 257 to 263 (1962); J. Phys. Chem. Solids, vol. 26, pages 1445–1458 (1965); and Handbook of Preparative Inorganic Chemistry, vol. II, page 1327 2nd ed., Academic Press (1965).

Following the general procedures outlined in the foregoing publications, tantalum disulfide, for example, has been prepared in both crystal and powder form. Thus the powder form was obtained by direct combination of the elements in evacuated quartz ampoules at elevated temperatures. The preparation included slowly heating, in a stoichiometric ratio of 1:2 a few grams of ultrapure tantalum wire and ultrapure sulfur (such as in the form of chips) in a quartz ampoule which was evacuated and then sealed under vacuum. Bulk tantalum was found to be preferrable to powder because the latter tends to absorb water from the air.

The quartz ampoule was placed in a furnace and the furnace temperature was raised very slowly to 950° C. A slow increase in temperature after approximately 400° C. was essential to prevent the sulfur vapor pressure from exploding the ampoule. By slow increase of the temperature, the sulfur had time to react with the bulk tantalum and was consumed so the vapor pressure did not rise to a dangerous level. This procedure required about 3 weeks. Once the tantalum-sulfur combination had attained the temperature of 950° C., the oven was allowed to remain at that temperature for a week or two. This insured complete reaction of the components and a homogeneous combination of tantalum and sulfur as tantalum disulfide.

After holding the reacted components for 1 or 2 weeks at 950° C. the temperature of the oven was slowly decreased over a period of 3 weeks. During most of this time the oven temperature was retained above 400° C. The slow cooling was necessary to insure that the chalcogenide would readily intercalate. Material which was cooled rapidly from the higher temperature was found to be generally less acceptable for intercalation. The tantalum disulfide prepared in this manner was a black, highly crystalline, free-flowing powder.

Alternatively, tantalum disulfide crystals have been prepared by iodine vapor transport, i.e., charging a quartz ampoule with a few grams of $TaS_2$ and 5 mg. $I_2$ per cc., and heating the ampoule in a temperature gradient from 800 to 700° C. (Under these conditions, the material was transported at rates of the order of a gram or two per week. Higher rates were obtained by going to higher hot end temperatures and larger tubes.) After several days the oven was turned off and allowed to cool slowly to room temperature. It is preferable to cool slowly so as to product a phase that will intercalate readily. Fast cooling may form polymorphs or disordered phases of $TaS_2$ that are more difficult to intercalate.

Titanium disulfide powder of reasonably good quality was prepared in approximately the same manner as that described for tantalum disulfide. The principal difference was that the maximum temperature required to complete the reaction was substantially less than 950° C. It was found that a maximum temperature of 650° C. was adequate when employing the same reaction times as those employed for tantalum disulfide. It has been reported in the literature that when titanium disulfide is prepared at higher temperatures, it is not stoichiometric.

Niobium disulfide, niobium ditelluride, niobium diselenide, tantalum diselenide, tantalum ditelluride, titanium diselenide, and titanium ditelluride have been prepared by the procedure set forth at page 8, line 24 et seq. and page 10, line 1 et seq. Similar preparation techniques are generally applicable to the formation of all the chalcogenides disclosed herein. Variations in temperature and time for optimum chalcogenide formation will be obvious to those skilled in this art.

Intercalation of the aforementioned inorganic compounds, where such materials have a melting point below about 150° C., can be best accomplished by the sealed tube (heat melt) method. This method, especially suitable for intercalating a Lewis base having a low melting point, involves immersing the chalcogenide crystals in a liquid phase (neat melt) of the inorganic intercalate for a time sufficient to cause intercalation. Sufficient prolongation of the residence time creates an equilibrium condition. Modifications in pressure or temperature also affect the rate of intercalation, with higher temperatures and pressures accelerating the equilibrium condition. Lower reaction temperatures are preferred however because at higher temperatures, undesirable side reactions may occur.

Alternative procedures that can also be used with inorganic compounds having higher melting points include:

(1) Solution Technique: Immersing the intercalate in a solvent less rapidly intercalated than the inorganic compound, at an appropriate temperature that may be elevated.

(2) Cointercalation: The chalcogenide crystals are first intercalated with an appropriate compound. The crystals are then treated by one of the above procedures with the desired intercalate which then intercalates along with the first compound.

(3) Catalytic Intercalation: The chalcogenide crystals are first treated with a compound that intercalates readily. They are then treated with a second compound that intercalates at an accelerated rate due to the presence of the first compound. In this process, the first compound is displaced by the second compound.

(4) Vapor Phase Intercalation: The chalcogenide crystals to be intercalated are placed in the vapor of the compound to be intercalated.

(5) Solid Phase Intercalation: The chalcogenide crystals to be intercalated are covered and mixed with the compound to be intercalated at an apropriate, perhaps elevated, temperature.

Each of the aforementioned techniques are similar in that the intercalation is allowed to proceed a suitable length of time before the crystals are separated from the excess compound. The suitable time will depend on the amount of material one wishes to place inside the crystal. The preferred method of intercalation requires that the layered crystals be removed from the solution (or melt) of the intercalate as soon as the intercalation has gone to completion. In this manner decomposition of the layered crystal, such as by hydrolysis, is minimized.

In practicing the solution technique, the chalcogenide, in either the form of crystals or microcrystalline powder, is placed in a sintered glass filter-funnel. The compound to be intercalated is dissolved in a suitable solvent, such as water, methanol, acetone, DMSO, etc., and the resulting solution is added to the filter-funnel containing the chalcogenide. The reaction mixture is allowed to stand at room temperature or at a slightly elevated temperature for several hours with occasional shaking of the reaction mixture. Some reactions are completed within several minutes while others can require up to several days depending on the concentration of the intercalation solution and/or the agent to be intercalated. In other cases, the rate of reaction can be accelerated by drawing off the supernatant liquid and replenishing it with additional intercalate/solvent. When the reaction has been completed, suction is applied to the filter-funnel so as to remove the unreacted solution. The remaining solid is washed with the solvent and then dried.

The course of the reaction can also be followed by removing aliquots of the supernatant liquid and determining the change in concentration of the solution by suitable spectroscopic or other analytical techniques. When the concentration remains constant, the end of the intercalation reaction is indicated. Numerous variations of the above procedure can be used by employing simple laboratory equipment and techniques.

By way of a specific example of this procedure, 0.68 grams of tantalum disulfide in a microcrystalline powder form was placed in a sintered glass filter-funnel. 15 milliliters of a 2 N solution of potassium hydroxide in methanol was added to the filter-funnel containing the chalcogenide. The reaction mixture was allowed to stand at room temperature for several minutes with occasional shaking of the reaction mixture. Suction was then applied to the filter-funnel to remove the supernatant solution. The above procedure was repeated with 15 milliliters of the aforementioned solution. Thereafter the remaining solid was washed several times with methanol, then methylene chloride and then dried. The total weight gain for the tantalum disulfide crystals was 8.5%, i.e., the equivalent of 0.38 mole equivalents of potassium hydroxide/mole equivalent of tantalum disulfide.

The following Table III contains data for tantalum disulfide, intercalated with the inorganic compounds in the solvent system specified. In each case the solution technique set forth for tantalum disulfide/potassium hydroxide at page 13, line 8 et seq., was employed. It will be apparent to one skilled in this art that variations in solution concentration as well as reaction times will result in optimum yields.

TABLE III

Compounds intercalated with $TaS_2$ at room temperature

| Compound | Solvent | Weight gain (percent) | Critical temp. (° K.) | X-Ray[1] $\Delta d$ (A.) |
|---|---|---|---|---|
| $NH_4OH$ | $H_2O$ | 7.2 | 3.2 | 3.04 |
| $LiOH$ | $H_2O$ | 12.0 | 4.5 | 2.92 |
| $NaOH$ | $H_2O$ | | 3.6 | 5.85 |
| $KOH$ | $H_2O$ | 8.5 | | 3.01 |
| $RbOH$ | $H_2O$ | | | 3.10 |
| $CsOH$ | $H_2O$ | 15.0 | 3.7 | 3.25 |
| $KOH$ | $CH_3OH$ | 8.5 | 5.2 | 2.98 |
| $NaHS$ | $H_2O$ | >6 | 3.6 | 3.12 |
| $Na_2S$ | $H_2O$ | >7 | 3.5 | 5.75 |
| $Na_2SO_3$ | $H_2O$ | 15.2 | 5.2 | |
| $NaN_3$ | $H_2O$ | 18.2 | 3.6 | |

[1] Increase in interlayer spacing after intercalation.

Superconductivity is that property of many compounds at temperatures near absolute zero wherein their electrical resistivity vanishes. Substances having superconductive characteristics have found application in magnets, particle accelerators, computer memory units and the like.

Superconductivity is conventionally detected by placing a sample of the compound inside one of two equivalent coils which are so connected that the effective mutual inductance between the pair and a third coil which surrounds them is zero. The onset of superconductivity in the sample changes the coupling between the coil in which it is placed and the aforementioned third coil. When this occurs the net mutual inductance between the pair of coils and the surrounding (3rd) coil is no longer zero. A voltage is then developed across the pair and is measured using a phase sensitive detector.

Within the broad definition of the novel compositions of this invention, are a series of transition metal chalcogenides containing any of the inorganic ionic intercalates set forth supra, that display modified superconductivity from that known to be demonstrated by the chalcogenide per se. Specific chalcogenides within this definition include $NbS_2$, $NbSe_2$, $NbTe_2$, $TiTe_2$, $VSe_2$, $TaTe_2$, $PdTe_2$, $TaS_2$, and $TaSe_2$. Other particularly advantageous compositions are obtained by intercalation of others of the aforementioned chalcogenides.

Some of the intercalated chalcogenides exhibited critical temperatures higher than that known for the unintercalated chalcogenide. In addition, all the intercalated chalcogenides have been found to be useful because of uniquely high anisotropy of their critical field and current and because of the weak coupling between layers.

What is claimed is:

1. A composition of matter comprising: a structured layered intercalate-containing heavy metal chalcogenide, the heavy metal being selected from the group consisting of titanium, niobium, and tantalum, and mixtures thereof, the chalcogen being selected from the group consisting of sulfur, selenium, and tellurium or mixtures thereof and the intercalate being an ammonium or non-heavy metal inorganic salt or hydroxide.

2. A composition of matter comprising: a structurally layered intercalate-containing tantalum disulfide, wherein the intercalate is an ammonium or non-heavy metal inorganic salt or hydroxide.

3. A composition of matter according to claim 2, wherein said intercalate is an alkali metal hydroxide.

4. A composition of matter according to claim 2, wherein said intercalate is ammonium hydroxide.

5. A composition of matter according to claim 2, wherein said intercalate is an alkali metal salt.

6. A composition of matter according to claim 2, wherein said salt has a sulfur-containing anion selected from the group consisting of $SO_4^{--}$, $SO_3^{--}$, $S_2O_3^{--}$, $S^{--}$, $HS^-$, $S_2O_7^{--}$ and $S_2O_4^{--}$.

7. A composition of matter according to claim 2, wherein said salt has azide as its anion.

References Cited
UNITED STATES PATENTS

| | | | |
|---|---|---|---|
| 3,573,204 | 3/1971 | Van Wyk | 252—25 |
| 3,479,289 | 11/1969 | Van Wyk | 252—25 |
| 3,523,079 | 8/1970 | Boes et al. | 252—25 |

DANIEL E. WYMAN, Primary Examiner

I. VAUGHN, Assistant Examiner

U.S. Cl. X.R.

250—51.5; 252—518